(12) United States Patent
Kim

(10) Patent No.: US 12,039,687 B2
(45) Date of Patent: Jul. 16, 2024

(54) APPARATUS AND METHOD WITH 3D MODELING

(71) Applicant: SAMSUNG ELECTRONICS CO., LTD., Suwon-si (KR)

(72) Inventor: Jiyeon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 17/826,251

(22) Filed: May 27, 2022

(65) Prior Publication Data
US 2023/0186580 A1    Jun. 15, 2023

(30) Foreign Application Priority Data

Dec. 10, 2021  (KR) ........................ 10-2021-0176262

(51) Int. Cl.
*G06T 15/00*    (2011.01)
*G06T 7/11*    (2017.01)
(Continued)

(52) U.S. Cl.
CPC .............. *G06T 19/20* (2013.01); *G06T 7/11* (2017.01); *G06T 7/251* (2017.01); *G06T 7/75* (2017.01);
(Continued)

(58) Field of Classification Search
CPC ...... G06F 3/04615; G06F 3/011; G06T 7/579; G06T 7/75; G06T 7/251; G06T 7/20;
(Continued)

(56) References Cited

U.S. PATENT DOCUMENTS 8,131,063 B2   3/2012   Xiao et al.
9,424,461 B1   8/2016   Yuan et al.
(Continued)

FOREIGN PATENT DOCUMENTS

CN            113160418 A     7/2021
KR     10-2017-0020210 A     2/2017

OTHER PUBLICATIONS

Kim JB, Kim HJ. Efficient region-based motion segmentation for a video monitoring system. Pattern recognition letters. Jan. 1, 2003; 24(1-3):113-28.*

(Continued)

*Primary Examiner* — Phu K Nguyen
(74) *Attorney, Agent, or Firm* — NSIP Law

(57) ABSTRACT

A processor-implemented method with three-dimensional (3D) modeling includes: determining a type of movement of an object detected in an image received from a sensor, based on a variability of a position of the object and a variability of a shape of the object; segmenting the object into one or more chunks each corresponding to a unit of movement, based on the determined type of movement; correcting the determined type of movement based on a change in position of one or more feature points of the one or more chunks of the object in the image; determining a state of the movement of the object based on the corrected type of the movement of the object; correcting a pose of the sensor based on a state of the object; and updating a pose for each of the one or more chunks of the object based on the determined state of the object and the corrected pose of the sensor.

25 Claims, 8 Drawing Sheets

(51) Int. Cl.
*G06T 7/246* (2017.01)
*G06T 7/73* (2017.01)
*G06T 17/20* (2006.01)
*G06T 19/20* (2011.01)

(52) U.S. Cl.
CPC ...... *G06T 17/20* (2013.01); *G06T 2219/2004* (2013.01)

(58) Field of Classification Search
CPC ........... G06T 7/55; G06T 17/20; G06T 7/246; G06T 7/11; G06T 19/20; G06T 2219/2004; G06T 2207/20084
USPC ......................................................... 345/418
See application file for complete search history.

(56) References Cited

U.S. PATENT DOCUMENTS

| | | | |
|---|---|---|---|
| 10,311,648 | B2 | 6/2019 | Murali et al. |
| 10,361,802 | B1* | 7/2019 | Hoffberg-Borghesani ................. G06F 3/00 |
| 11,770,551 | B2* | 9/2023 | Ahmadyan ............ G06V 20/49 382/236 |
| 2013/0077854 | A1 | 3/2013 | Kobayashi et al. |
| 2019/0043203 | A1 | 2/2019 | Fleishman et al. |
| 2019/0371080 | A1* | 12/2019 | Sminchisescu ......... G06T 17/20 |
| 2020/0349763 | A1 | 11/2020 | Chen et al. |
| 2020/0380779 | A1 | 12/2020 | Khazov et al. |
| 2021/0110557 | A1 | 4/2021 | Busey |
| 2021/0142492 | A1 | 5/2021 | Ahmed et al. |
| 2021/0279967 | A1 | 9/2021 | Gernoth et al. |
| 2021/0287013 | A1* | 9/2021 | Carter ..................... G06F 18/21 |
| 2022/0026519 | A1* | 1/2022 | Wu ......................... G01S 7/006 |
| 2022/0198368 | A1* | 6/2022 | May ............... G06Q 10/063112 |
| 2023/0068660 | A1* | 3/2023 | Brent ...................... G06F 9/453 |

OTHER PUBLICATIONS

Wang Z, Wang S, Zhang X, Wang S, Ma S. Three-zone segmentation-based motion compensation for video compression. IEEE Transactions on Image Processing. Apr. 16, 2019;28(10):5091-104.*
Wang Y, Huang S. Motion segmentation based robust RGB-D Slam. InProceeding of the 11th World Congress on Intelligent Control and Automation Jun. 29, 2014 (pp. 3122-3127). IEEE.*
Rosen DM, Doherty KJ, Teran Espinoza A, Leonard JJ. Advances in inference and representation for simultaneous localization and mapping. Annual Review of Control, Robotics, and Autonomous Systems. May 3, 2021;4:215-42.*
Cong Y, Liao W, Ackermann H, Rosenhahn B, Yang MY. Spatial-Temporal Transformer for Dynamic Scene Graph Generation. arXiv preprint arXiv:2107.12309. Jul. 26, 2021.*
Bhat G, Danelljan M, Van Gool L, Timofte R. Know your surroundings: Exploiting scene information for object tracking. InComputer Vision-ECCV 2020: 16th European Conference, Glasgow, UK, Aug. 23-28, 2020, Proceedings, Part XXIII 16 2020 (pp. 205-221). Springer International Publishing.*
Tian X, Zheng P, Huang J. Robust Privacy-Preserving Motion Detection and Object Tracking in Encrypted Streaming Video. arXiv preprint arXiv:2108.13141. Aug. 30, 2021.*
Rosinol, Antoni, et al. "3D dynamic scene graphs: Actionable spatial perception with places, objects, and humans." arXiv preprint arXiv:2002.06289 (Jun. 16, 2020). 11 pages.
Bescos, Berta, et al. "DynaSLAM II: Tightly-coupled multi-object tracking and Slam." *IEEE robotics and automation letters* vol. 6, Issue Jul. 3, 2021, pp. 5191-5198.
Wang, Gu, et al. "Gdr-net: Geometry-guided direct regression network for monocular 6d object pose estimation." *Proceedings of the IEEE/CVF Conference on Computer Vision and Pattern Recognition*. 2021. pp. 16611-16621.
Extended European search report issued on Jul. 10, 2023, in counterpart European Patent Application No. 22212334.1 (8 pages).

* cited by examiner

APPARATUS AND METHOD WITH 3D MODELING

CROSS-REFERENCE TO RELATED APPLICATIONS

This application claims the benefit under 35 USC § 119(a) of Korean Patent Application No. 10-2021-0176262, filed on Dec. 10, 2021 in the Korean Intellectual Property Office, the entire disclosure of which is incorporated herein by reference for all purposes.

BACKGROUND

1. Field

The following description relates to an apparatus and method with three-dimensional (3D) modeling.

2. Description of Related Art

Three-dimensional (3D) modeling technology may include transforming 3D information about a real space to a form of a point cloud, a mesh, CAD, and the like to have 3D geometry information and red-green-blue (RGB) information. As an example of various methods for 3D modeling, there is a method of segmenting a real space using an object based on semantics and performing modeling based on the object. Research is actively conducted on technology for estimating a pose of an object-based camera using an object-oriented 3D model or technology for deploying a virtual 3D object based on a relative positional relationship between objects estimated through a camera pose estimation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with three-dimensional (3D) modeling includes: determining a type of a movement of an object detected in an image received from a sensor; segmenting the object into chunks corresponding to a unit of movement based on the type of the movement of the object and 3D model information corresponding to the object; correcting the type of the movement of the object based on a change in a position of a feature point for each chunk of the object in the image; determining a state of the movement of the object based on the corrected type of the movement of the object and a pose for each chunk of the object that is determined in correspondence to a frame of the image; correcting a pose of the sensor based on a state of the object; and updating the pose for each chunk of the object based on the state of the object and the corrected pose of the sensor.

The correcting the type of the movement of the object may include: determining the change in the position of the feature point for each chunk of the object based on previous frames of the frame in the image; determining whether a relative position between chunks included in the same object is changed based on the change in the position of the feature point for each chunk of the object; and correcting the type of the movement of the object based on a result of the determining of whether the relative position is changed.

The determining the state of the movement of the object may include: determining a pose of each chunk of the object corresponding to the frame based on a position of a feature point of each chunk of the object that is estimated in correspondence to the frame; determining transformation information of the pose for each chunk of the object based on a pose for each chunk of the object that is determined in correspondence to a previous frame of the frame and the pose for each chunk of the object that is determined in correspondence to the frame; and determining the state of the movement of the object based on the corrected type of the movement of the object and the transformation information of the pose for each chunk of the object.

The determining the pose for each chunk of the object corresponding to the frame may include estimating the feature point for each chunk of the object corresponding to the frame based on a neural network that is trained to extract the feature point for each chunk of the object.

The determining the pose for each chunk of the object corresponding to the frame may include estimating the feature point for each chunk of the object corresponding to the frame based on tracking of the feature point for each chunk of the object included in the image.

The correcting the pose of the sensor may include correcting the pose of the sensor based on a pose for each chunk of the object that is determined to be in a static state as a result of determining the state of the movement of the object.

The updating the pose for each chunk of the object may include updating the pose for each chunk of the object that is determined to be in a moving state as a result of determining the state of the movement of the object based on the corrected pose of the sensor.

The type of the movement of the object may include any one or any combination of any two or more of a first type in which a position and a shape of the object are invariable, a second type in which the position of the object is variable and the shape of the object is invariable, and a third type in which the position and the shape of the object are variable.

The determining the type of the movement of the object may include determining the type of the movement of the object that matches identification information of the object based on the identification information of the object that is detected through segmentation of the image.

The segmenting the object into the chunks may include either one or both of: determining 3D model information prestored in correspondence to the object; and determining 3D model information corresponding to the object by reconstructing an image of the object included in the image.

The method may include outputting either one or both of the pose of the sensor and the pose for each chunk of the object.

The 3D model information corresponding to the object may include mesh information for representing a shape of the object and structural information of the object.

In another general aspect, one or more embodiments include a non-transitory computer-readable storage medium storing instructions that, when executed by one or more processors, configure the one or more processors to perform any one, any combination, or all operations and methods described herein.

In another general aspect, a processor-implemented method with three-dimensional (3D) modeling includes: determining a type of a movement of an object included in an image based on a portion of frames of the image received from a sensor; and, for each of frames of the image received after the portion of the frames: determining a position of a feature point for each chunk of the object in a corresponding frame based on information about the object of which the type is determined; determining a pose for each chunk of the object corresponding to the corresponding frame based on the position of the feature point for each chunk of the object; determining a state of the movement of the object corresponding to the corresponding frame based on the type of the movement of the object and the pose for each chunk of the object; correcting a pose of the sensor based on a state of the object; and updating the pose for each chunk of the object based on the state of the object and the corrected pose of the sensor.

The determining the position of the feature point for each chunk of the object in the corresponding frame may include determining the type of the movement of the object included in the image based on the corresponding frame and the portion of the frames of the image received after the corresponding frame, in response to recognizing a new object of which the type is not determined in the corresponding frame.

In another general aspect, an apparatus with three-dimensional (3D) modeling includes: one or more processors configured to: determine a type of a movement of an object detected in an image received from a sensor; segment the object into chunks corresponding to a unit of movement based on the type of the movement of the object and 3D model information corresponding to the object; correct the type of the movement of the object based on a change in a position of a feature point for each chunk of the object in the image; determine a state of the movement of the object based on the corrected type of the movement of the object and a pose for each chunk of the object that is determined in correspondence to a frame of the image; correct a pose of the sensor based on a state of the object; and update the pose for each chunk of the object based on the state of the object and the corrected pose of the sensor.

For the correcting the type of the movement of the object, the one or more processors may be configured to: determine the change in the position of the feature point for each chunk of the object based on previous frames of the frame in the image; determine whether a relative position between chunks included in the same object is changed based on the change in the position of the feature point for each chunk of the object; and correct the type of the movement of the object based on a result of the determining of whether the relative position is changed.

For the determining the state of the movement of the object, the one or more processors may be configured to: determine a pose for each chunk of the object corresponding to the frame based on a position of a feature point of each chunk of the object that is estimated in correspondence to the frame; determine transformation information of the pose for each chunk of the object based on a pose for each chunk of the object that is determined in correspondence to a previous frame of the frame and the pose for each chunk of the object that is determined in correspondence to the frame; and determine the state of the movement of the object based on the corrected type of the movement of the object and the transformation information of the pose for each chunk of the object.

In another general aspect, an apparatus with three-dimensional (3D) modeling includes: one or more processors configured to: determine a type of a movement of an object included in an image based on a portion of frames of the image received from a sensor; and, for each of frames of the image received after the portion of the frames: determine a position of a feature point for each chunk of the object in a corresponding frame based on information about the object of which the type is determined; determine a pose for each chunk of the object corresponding to the corresponding frame based on the position of the feature point for each chunk of the object; determine a state of the movement of the object corresponding to the corresponding frame based on the type of the movement of the object and the pose for each chunk of the object; correct a pose of the sensor based on a state of the object; and update the pose for each chunk of the object based on the state of the object and the corrected pose of the sensor.

For the determining the position of the feature point for each chunk of the object in the corresponding frame, the one or more processors may be configured to determine the type of the movement of the object included in the image based on the corresponding frame and the portion of the frames of the image received after the corresponding frame in response to recognizing a new object of which the type is not determined in the corresponding frame.

In another general aspect, a processor-implemented method with three-dimensional (3D) modeling includes: determining a type of movement of an object detected in an image received from a sensor, based on a variability of a position of the object and a variability of a shape of the object; segmenting the object into one or more chunks each corresponding to a unit of movement, based on the determined type of movement; correcting the determined type of movement based on a change in position of one or more feature points of the one or more chunks of the object in the image; determining a state of the movement of the object based on the corrected type of the movement of the object; correcting a pose of the sensor based on a state of the object; and updating a pose for each of the one or more chunks of the object based on the determined state of the object and the corrected pose of the sensor.

The correcting of the determined type of movement may include correcting the determined type of movement in response to the change in position not corresponding to the determined type of movement.

The determined type of movement may indicate an invariability of the position of the object, and the correcting of the determined type of movement may include correcting the determined type of movement in response to the change in position not corresponding to the invariability.

The change in position may include a change in position between feature points of a same chunk of the one or more segmented chunks, the determined type of movement may indicate an invariability of the shape of the object, and the correcting of the determined type of movement may include correcting the determined type of movement in response to the change in position between the feature points of the same chunk not corresponding to the invariability.

Each of the one or more segmented chunks may indicate the unit of motion such that a distance between feature points of the chunk are maintained in response to a movement of the object.

Other features and aspects will be apparent from the following detailed description, the drawings, and the claims.

Figure 1:
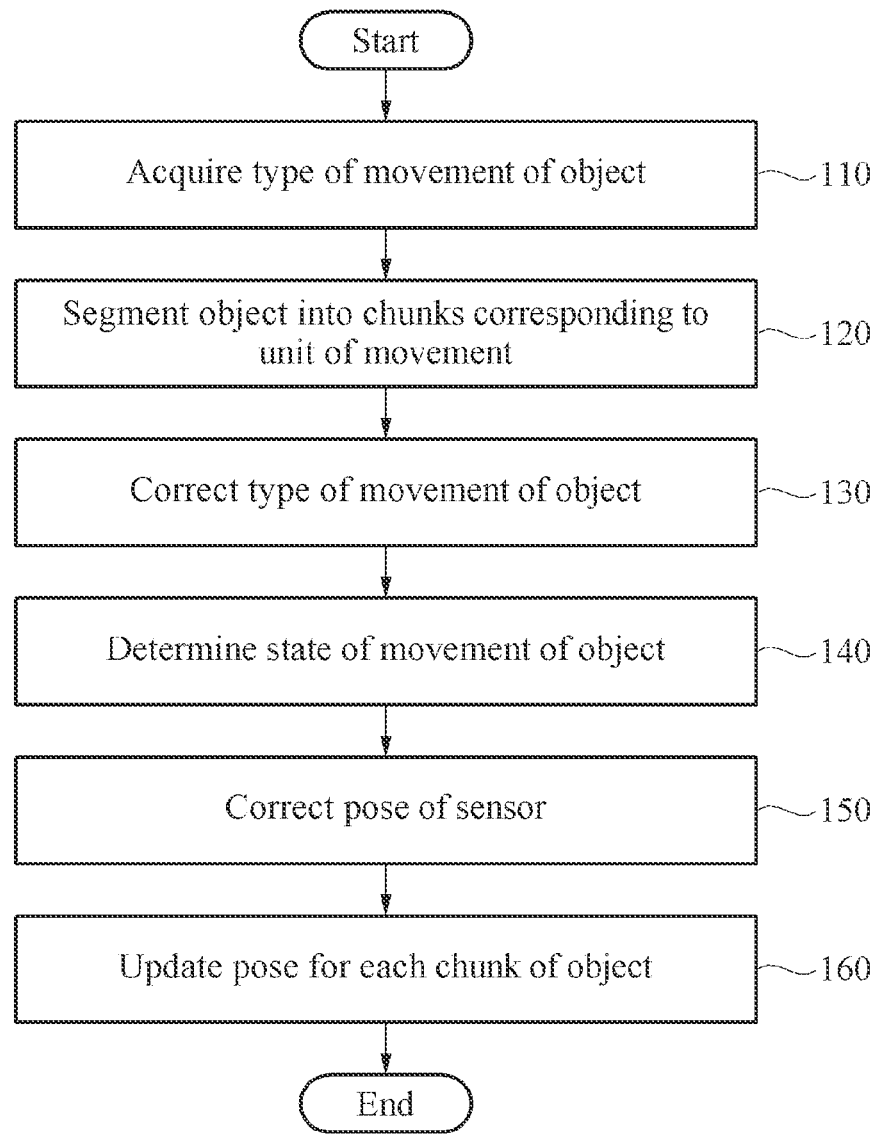
FIG. 1 is a flowchart illustrating an example of a three-dimensional (3D) modeling method.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

Hereinafter, examples are described with reference to the accompanying drawings. In describing the examples with reference to the accompanying drawings, like reference numerals refer to like elements although they are illustrated in different drawings. Further description related thereto is omitted.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

Although terms of "first," "second," and the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure.

The articles "a", "an", and "the" are intended to include the plural forms as well, unless the context clearly indicates otherwise. The term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined herein, all terms used herein, including technical or scientific terms, have the same meanings as those generally understood by one of ordinary skill in the art to which this disclosure pertains and based on an understanding of the disclosure of the present application. Terms, such as those defined in dictionaries generally used, should be construed to have meanings matching contextual meanings in the related art and the disclosure of the present application, and are not to be construed as an ideal or excessively formal meaning unless otherwise defined herein.

Hereinafter, the examples are described in detail with reference to the accompanying drawings. Like reference numerals illustrated in the respective drawings refer to like elements and further description related thereto is omitted.

FIG. 1 is a flowchart illustrating an example of a three-dimensional (3D) modeling method.

Referring to FIG. 1, the 3D modeling method may include operation 110 of acquiring (e.g., determining) a type of a movement of an object, operation 120 of segmenting the object into chunks (e.g., segments or portions) corresponding to a unit of movement, operation 130 of correcting the type of the movement of the object, operation 140 of determining a state of the movement of the object, operation 150 of correcting a pose of a sensor, and operation 160 of updating a pose for each chunk of the object.

In an example, the 3D modeling method may be performed a processor (e.g., one or more processors). For example, the processor may be included in an apparatus (an apparatus 800 of FIG. 8, as a non-limiting example) that receives an image and performs 3D modeling on the image. A non-limiting example configuration of the apparatus that performs the 3D modeling method is described below.

Figure 8:
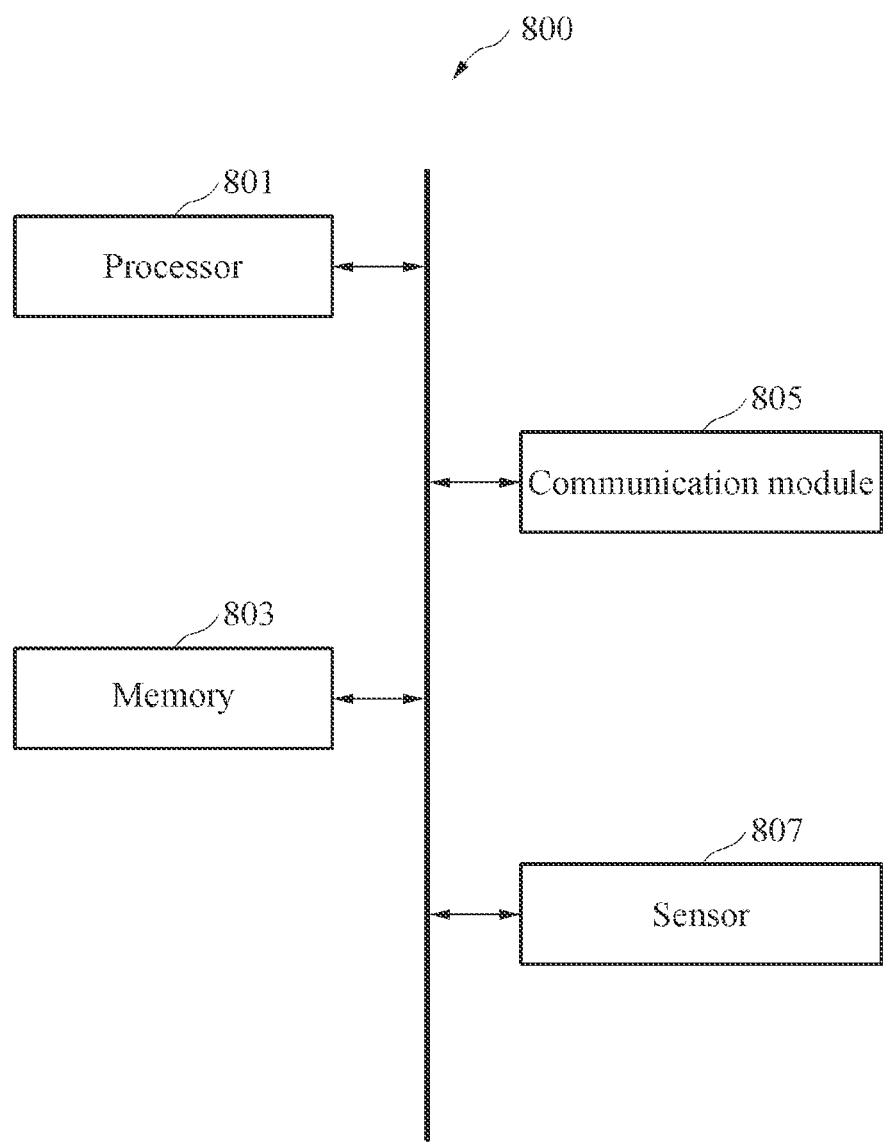
FIG. 8 illustrates an example of a configuration of an apparatus.

Operation 110 may include an operation of acquiring a type of a movement of an object detected in an image received from a sensor (a sensor 807 of FIG. 8, as a non-limiting example). The sensor may refer to an image capturing sensor and may include, for example, a camera. The image may include a video that includes a plurality of frames. A single frame in the image may correspond to an image corresponding to a specific time of the image and the image may include a plurality of frames according to time sequence.

In an example, at least one object included in the received image may be detected and recognized by performing segmentation and/or classification on the received image. An area of the detected object may be extracted from a frame of the image and a result of recognizing which object corresponds to the object corresponding to the area may be extracted.

In an example, the type of the movement of the object may be classified depending on whether a position of the object is variable and whether a shape of the object is variable. For example, the type of the movement of the object may include at least one of a first type in which the position and the shape of the object are invariable, a second type in which the position of the object is variable and the shape of the object is invariable, and a third type in which the position and the shape of the object are variable. An object of the first type may include, for example, an object constituting any of a skeleton of a building, such as a wall, a floor, a ceiling, and a pillar. An object of the second type may include, for example, an object that may move while maintaining a shape of the object (such as a table, a chair, and a cup, for example). An object of the third type may include, for example, an object of which a shape is variable (such as a person, a curtain, a blanket, clothes, a cable, a stuffed toy, and a ball, for example).

In an example, the type of the movement of the object may be matched to identification information of the object. The identification information of the object may correspond to a result of detecting and recognizing the object included in the image by performing segmentation and/or classification on the image. For example, the identification information may include a result of recognizing an area of an object included in an image that is captured from a vehicle driving on a road, as any of a road, a traffic light, a vehicle, and a pedestrian.

In an example, the type of the movement of the object may be determined based on the identification information of the corresponding object. For example, the identification information of the object may be matched to one of movement-related types that include the first type, the second type, and the third type. For example, an object recognized as a "floor" in the image may be matched to the first type among the movement-related types based on identification information of the "floor," an object recognized as a "table" may be matched to the second type among the movement-related types, and an object recognized as a "person" may be matched to the third type among the movement-related types. As described in non-limiting examples below, a movement-related type determined based on the identification information may be corrected according to an actual movement of a corresponding object detected in the image. For example, the type of the movement of the object recognized as the "table" may be determined as the second type that is matched to "table," however, when a change in a shape (such as a leg of the object recognized as the "table" in the image being folded) is detected, the type may be corrected as or to the third type. A non-limiting example operation of correcting the type of the movement of the object is described below.

Operation 120 may include an operation of segmenting the object into chunks corresponding to the unit of movement based on the type of the movement of the object and 3D model information corresponding to the object.

In an example, the 3D model information may include, for example, mesh information for representing a shape of the object and structural information of the object as information that represents a 3D shape of the object included in the image. The structural information of the object may include, for example, skeleton information that indicates a position of a joint of the object and a connection relationship between joints as information that classifies the object into at least one element and a structure in which the respective elements are connected.

In an example, when a feature point for expressing a shape of an object is assumed as a node, a chunk may include an edge that represents a relationship between nodes. The chunk refers to a unit of movement of the object. Here, a deformation of a node and/or an edge in a chunk may affect another node and/or edge in the same corresponding chunk, but may not affect a deformation in a node and/or an edge in another chunk aside from the same corresponding chunk. That is, the chunk may correspond to a portion of an object capable of performing, or configured to perform, a movement of an independent aspect in the object. A chunk may be minimum unit having the same movement when an external force or effect is applied, for example. When the object is a human body, a chunk may be a portion of the body from a joint to a next adjacent joint (e.g., a thigh area from a knee joint to a hip joint), as a non-limiting example.

Operation 120 may be performed for an object of a specific type in relation to a movement. For example, operation 120 may be performed for the object of the third type in which the shape of the object is variable. The object of the first type corresponds to an object of which a position and a shape are invariable and thus, may not be segmented into chunks in operation 120. The object of the second type corresponds to an object of which the shape is invariable, that is, of which a portion does not move differently from another portion and thus, may not be segmented into chunks in operation 120. As a non-limiting example, operation 120 may include determining to segment the object into chucks when the determined type of the movement of the object includes the third type, and/or may include determining not to segment an object into chucks when the determined type of the movement of the object does not include the third type. The object of the first type and the object of the second type may be recognized as a single chunk instead of being segmented into a plurality of chunks.

Figure 2:
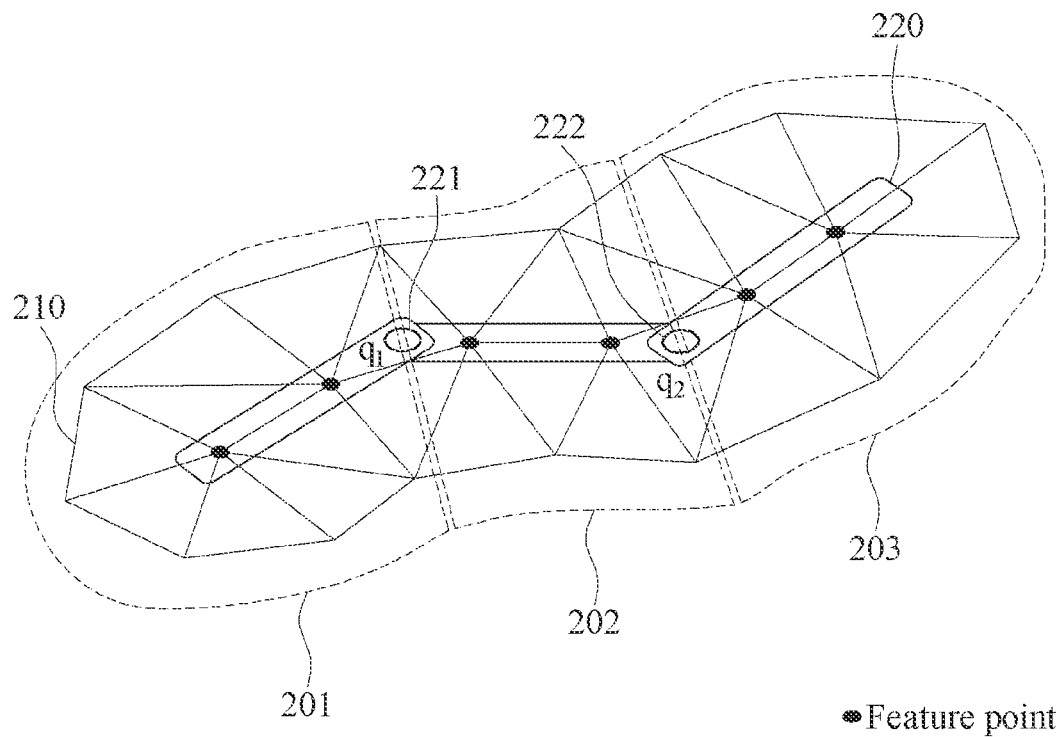
FIG. 2 illustrates an example of 3D model information of an object.

In an example, the type of the third object may be segmented into chunks based on 3D model information of the object. For example, referring to FIG. 2, the 3D model information of the object may include mesh information 210 that represents a position of a polygon for representing a shape of the object and structural information including joints 221 and 222 of the object and a connection relationship thereof. The object may be segmented into three chunks 201, 202, and 203 based on the 3D model information of the object. For example, the chunk 201 may move independently from other chunks 202 and 203 through rotation using the joint 221 as an axis or through contraction and/or expansion.

In an example, a chunk may include at least one feature point and a movement of the chunk may be determined based on a change in a position of the feature point. For example, when a distance between feature points in the chunk decreases, a movement of the chunk may be determined as a contracting movement. When a position of a feature point changes by the same displacement, the movement of the chunk may be determined as a translation movement. When the feature point rotates based on a specific axis, the movement of the chunk may be determined as a rotational movement.

In an example, operation 120 may further include at least one of an operation of acquiring 3D model information prestored in correspondence to the object and an operation of acquiring 3D model information corresponding to the object by reconstructing an image of the object included in the image. A memory (a memory 803 of FIG. 8, as a non-limiting example) accessible by a processor (a processor 801 of FIG. 8, as a non-limiting example) that performs the 3D modeling method disclosed herein may store the 3D model information corresponding to the object. For example, the memory accessible by the processor may include a memory in an apparatus (an apparatus 800 of FIG.

8, as a non-limiting example) that includes the processor and/or an external memory connected to the processor over a network.

Figure 3:
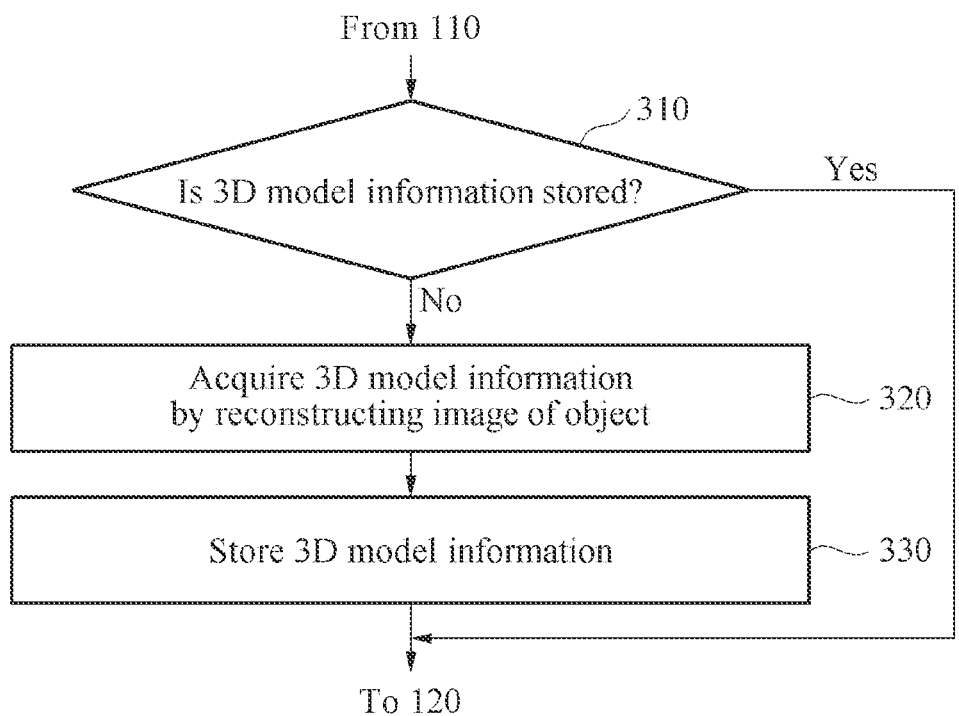
FIG. 3 is a flowchart illustrating an example of an operation of acquiring 3D model information of an object.

For example, referring to FIG. 3, the processor may determine whether the 3D model information is stored in an accessible memory in operation 310 and, when the 3D model information is stored, may perform operation 120 of segmenting the object into chunks based on the prestored 3D model information corresponding to the object prestored in the memory. Meanwhile, when the 3D model information is not stored, the processor may perform operation 320 of acquiring the 3D model information corresponding to the object by reconstructing the image of the object, operation 330 of storing the acquired 3D model information, and operation 120 of segmenting the object into chunks based on the acquired 3D model information. The processor may store the 3D model information acquired through reconstruction in the memory and then may use information prestored in the memory when the 3D model information about the same object is determined to be used.

In an example, reconstruction of an image to acquire the 3D model information of the object may be performed for at least one frame in the image. That is, the 3D model information of the object may be acquired by reconstructing at least one frame.

Operation 130 may include an operation of correcting the type of the movement of the object based on the change in the position of the feature point for each chunk of the object in the image.

In an example, the feature point of the object may correspond to a keypoint of the object as a feature point in the corresponding object that is detected by analyzing a frame of the image. For example, the feature point of the object may include at least one point of the object that represents a shape of the object, for example, a vertex of the object corresponding to a polygonal shape in the image and a point corresponding to each portion of a body such as a head, a shoulder, an arm, and a leg of a human object.

For example, the feature point of the object may be acquired based on a neural network that is trained to extract the feature point of the object from the image. The neural network for feature point extraction may be trained to extract the feature point of the corresponding object based on 3D model information and identification information according to segmentation of the object and may output the feature point in an area of the object corresponding to specific identification information in the image. For example, the neural network for the feature point extraction may extract a feature point of a consistent position corresponding to the object of the same identification information included in each of different images. For example, a point corresponding to the same position of an object may be extracted as a feature point from each of a first image and a second image that include an object corresponding to identification information of a "table."

In an example, the feature point for each chunk of the object may include at least one feature point included in the same chunk. That is, the feature point may include information about a chunk to which the corresponding feature point belongs and feature points extracted from the object may be classified for each chunk.

In an example, the change in the position of the feature point for each chunk may represent a change in positions of feature points included in the same chunk. The change in the position of the feature point may be acquired (e.g., determined) based on positions of feature points corresponding to a plurality of frames. For example, whether a position of a first feature point is changed and a displacement of the position of the feature point may be acquired based on a position of the first feature point acquired in a first frame and a position of the first feature point acquired in a second frame that is a subsequent frame of the first frame. That is, an operation of correcting the type of the movement of the object may include an operation of acquiring the change in the position of the feature point for each chunk of the object based on frames in the image, determining whether a relative position between chunks included in the same object is changed based on the change in the position of the feature point for each chunk of the object, and correcting the type of the movement of the object based on a result of the determining of whether the relative position is changed.

In an example, a type of a movement to be corrected may be determined based on an aspect of changes in positions of feature points included in the object. The aspect of such a positional change may be classified based on a type of the positional change and a displacement of a position. For example, a type of a change in a position (that is, a type of a positional change) may include translation, rotation, contraction, and/or expansion, and the displacement of the position may include a direction and a degree of the positional change. When the type of the positional change differs from (or does not correspond to) the variability of the position of the object and/or the shape of the object corresponding to the type of movement acquired in operation 110, the aspect of the positional change may also differ. When the type of the positional change is identical (or corresponds) to the variability of the acquired type of movement and the displacement of position differs from (or does not correspond to) the variability of the acquired type of movement, the aspect of the positional change may be determined to differ. For example, even in the case of the translation, when a direction of the translation or a degree of the translation differs, the aspect of the positional change may be determined to differ.

In an example, the type of the movement of the object determined in operation 110 may be corrected as, or to, a type of another movement based on the change in the position of the feature point for each chunk of the object.

For example, in response to the change in the position of the feature point included in the object of the first type in which a position of the object is invariable, the type of the movement of the object may be corrected as the second type or the third type that is a type in which the position of the object is variable. For example, when changes in positions of feature points included in the object of the first type correspond to the same aspect, the feature points may be determined to be included in the same chunk, and the type of the movement of the corresponding object may be corrected as the second type. Also, when changes in positions of feature points included in the object of the first type correspond to different aspects, the feature points may be determined to be included in different chunks and the type of the movement of the object may be corrected as the third type in which the object may be segmented into a plurality of chunks.

As another example, when changes in positions of feature points included in the same chunk correspond to different aspects, the feature points may be determined to not be included in the same chunk. For example, when changes in positions of feature points in the object of the second type including a single chunk correspond to different aspects, the feature points may be determined to be included in different chunks and the type of the movement of the object may be corrected from the second type to be the third type that includes a plurality of chunks accordingly.

Operation 140 may include an operation of determining a state (e.g., a static state or a moving state) of the movement of the object based on the corrected type of the movement of the object and a pose for each chunk of the object acquired in correspondence to a frame of the image.

The type of the movement (e.g., the corrected type of the movement) of the object included in the image may be determined through operations 110 to 130. When a plurality of objects are included in the image, a type of a movement of each of the plurality of objects may be determined. For example, in operation 140, the state of the movement of the object may be determined based on the type of the movement determined for the object of the image and the pose for each chunk of the object acquired in correspondence to a specific frame of the image. The specific frame refers to a frame included in the image and, for example, may correspond to a frame of an image that is received in real time. Hereinafter, the specific frame may be referred to as a first frame.

In an example, the pose for each chunk of the object acquired in correspondence to the first frame of the image may be acquired based on a position of a feature point for each chunk of the object included in the corresponding frame. For example, the position of the feature point for each chunk of the object may be estimated based on the neural network for the feature point extraction. As another example, the position of the feature point for each chunk of the object may be estimated based on tracking of the feature point for each chunk of the object included in the image. The pose of the chunk may include information about a position and a rotation of the corresponding chunk that is acquired based on the position of the feature point included in the corresponding chunk. For example, the pose of the chunk may include 6 degrees of freedom (6 DOF) information viewed from a sensor or may include 6 DOF information corresponding to a coordinate system having a predetermined feature point as an origin. For example, the pose of the chunk of the object corresponding to the third type in relation to the movement may further include information about scale for instructing contraction and expansion with information about the position and the rotation.

Operation 140 may include an operation of acquiring a pose for each chunk of the object corresponding to the frame based on a position of a feature point for each chunk of the object that is estimated in correspondence to the first frame, an operation of acquiring transformation information of the pose for each chunk of the object based on a pose for each chunk of the object that is acquired in correspondence to a previous frame of the first frame and the pose for each chunk of the object that is acquired in correspondence to the first frame, and an operation of determining the state of the movement of the object based on the corrected type of the movement of the object and the transformation information of the pose for each chunk of the object.

For example, the transformation information of the pose for each chunk of the object may include information indicating whether the pose for each chunk of the object is changed. When the pose for each chunk of the object acquired in correspondence to the first frame differs from the pose for each chunk of the object acquired in correspondence to the previous frame, it may be determined that there is a change in the pose for each chunk of the object.

As another example, the transformation information of the pose for each chunk of the object may include a transformation matrix acquired based on a difference between the pose for each chunk of the object acquired in correspondence to the first frame and the pose for each chunk of the object acquired in correspondence to the previous frame. A matrix instructing translation, rotation, contraction, and/or expansion for each chunk of the object for transforming the pose for each chunk of the object acquired in correspondence to the previous frame to the pose for each chunk of the object acquired in correspondence to the first frame may be acquired as the transformation matrix.

In an example, the state of the movement of the object may be determined based on transformation information of the pose for each chunk of the object and the type of the movement of the object. For example, when a type of a movement of an object corresponds to the first type, a pose of the object is invariable and thus, a state of the movement of the object may not be classified and the object may be determined to be in a static state at all times. When a type of a movement of an object corresponds to the second type including a single chunk, a state of the movement of the object may be determined to be a static state when a pose of the chunk is not changed and may be determined to be a moving state when the pose is changed. When a type of a movement of an object corresponds to the third type including at least one chunk, a state of the movement of the object may be determined to be in a static state when a pose for each chunk is not changed and may be determined to be in a moving state when the pose is changed.

In an example, when the type of the movement of the object corresponds to the third type and the state of the movement of the object is determined to be in the moving state, the moving state may be classified into either of two sub-states (e.g., either of a rigid body motion state and a deformation state). Compared to a pose for each chunk of the previous frame, when changes in poses of the entire chunks included in the object correspond to the same aspect, the moving state may be classified into the rigid body motion state. When the changes in the poses of the chunks included in the object correspond to different aspects, the moving state may be classified into the deformation state. Similar to an aspect of a positional change, an aspect of a change in a pose (that is, a pose change) may be classified based on a type of the pose change and a displacement of the pose. For example, the type of the pose change may include translation, rotation, contraction, and/or expansion, and the displacement of the pose may include a direction and a degree of the pose change. The aspect of the pose change may be determined based on the transformation matrix included in the transformation information of the pose for each chunk of the object.

Operation 150 may include an operation of correcting the pose of the sensor based on the state of the object. Operation 150 may include an operation of correcting the pose of the sensor based on a pose for each chunk of the object that is determined to be in a static state as a result of determining the state of the movement of the object. For example, a pose (e.g., 6 DOF) of a camera corresponding to a world coordinate system may be updated according to a transformation relationship between a camera coordinate system and the world coordinate system based on poses for the respective chunks corresponding to the camera coordinate system of objects that are determined to be in the static state.

Operation 160 may include an operation of updating the pose for each chunk of the object based on the state of the object and the corrected pose of the sensor. Operation 160 may include an operation of updating a pose of the object determined to be in a moving state as a result of determining the state of the movement of the object based on the corrected pose of the sensor. For example, when a type of a movement of an object corresponds to the second type, information about a rotation and a position of a pose for each chunk of the object may be updated. As another example, when a type of a movement of the object corresponds to the third type and the state of the movement of the object is in a rigid body motion state, information about a rotation and a position of a pose for each chunk of the object may be updated, and when the type of the movement corresponds to the third type and the state of the movement is in a deformation state, information about a rotation and a position of a pose for each chunk of the object and information about a scale may be updated.

The 3D modeling method disclosed herein may further include an operation of outputting at least one of the pose of the sensor and the pose for each chunk of the object. That is, the 3D modeling method may output the pose of the sensor and/or the pose for each chunk of the object as a result of 3D modeling.

Figure 4:
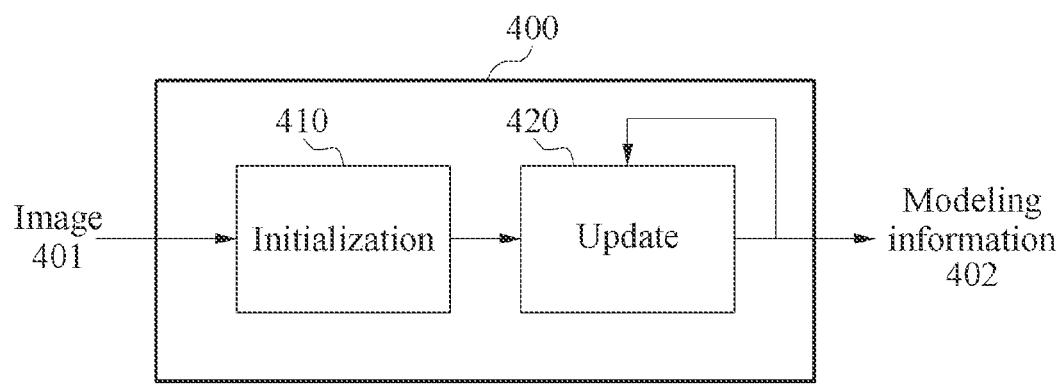
FIG. 4 illustrates an example of a framework of a model for 3D modeling.

FIG. 4 illustrates an example of a framework of a model for 3D modeling. Hereinafter, the model for 3D modeling may be simply referred to as a model.

Referring to FIG. 4, a model 400 may include an initialization module 410 configured to output modeling information 402 that is a result of 3D modeling of an input image 401 and an update module 420. The initialization module 410 and the update module 420 may correspond to a module configured to perform operations included in the modeling method described above with reference to FIG. 1. That is, the model 400 may correspond to a model that performs the 3D modeling method of FIG. 1. The initialization module 410 and the update module 420 are examples of a logical structure of the model 400 that performs the 3D modeling method and not construed as limiting a hardware structure of the model 400. Operations included in the 3D modeling method may be performed by at least one processor (the processor 801 of FIG. 8, as a non-limiting example) of an apparatus (the apparatus 800 of FIG. 8, as a non-limiting example) that implements the model 400.

The initialization module 410 may correspond to a module that performs an initialization operation for determining a type of a movement of an object included in an image 401. For example, the initialization operation may include any one, any combination of any two or more of, or all operation(s) included in operations 110 to 130 of FIG. 1. The initialization module 410 may receive a portion of initial frames according to time sequence of the image 401 or a portion of frames that are received at a point in time at which the initialization operation for the image 401 is determined to be performed, and the initialization operation may be performed in correspondence to the received portion of frames. For example, the initialization operation may be performed in correspondence to a preset number of frames (for example, 33 frames) starting with a first frame of the image 401.

The update module 420 may correspond to a module that performs an update operation of updating a pose for each chunk of the object included in the image 401 and a pose of a sensor. For example, the update operation may include any one, any combination of any two or more of, or all operation(s) included in operations 140 to 160 of FIG. 1. The update module 420 may be executed in runtime in correspondence to a frame of the image 401 that is received after a portion of frames input to the initialization module 410. That is, in response to receiving a frame of the image 401, the update operation for the received frame may be performed and, as a result, modeling information corresponding to the received frame may be output. Modeling information output for a specific frame may be used to perform the update operation for a subsequent frame of the specific frame.

Non-limiting example operations performed by the initialization module 410 and the update module 420 performed by the model 400 are described below.

Figure 5:
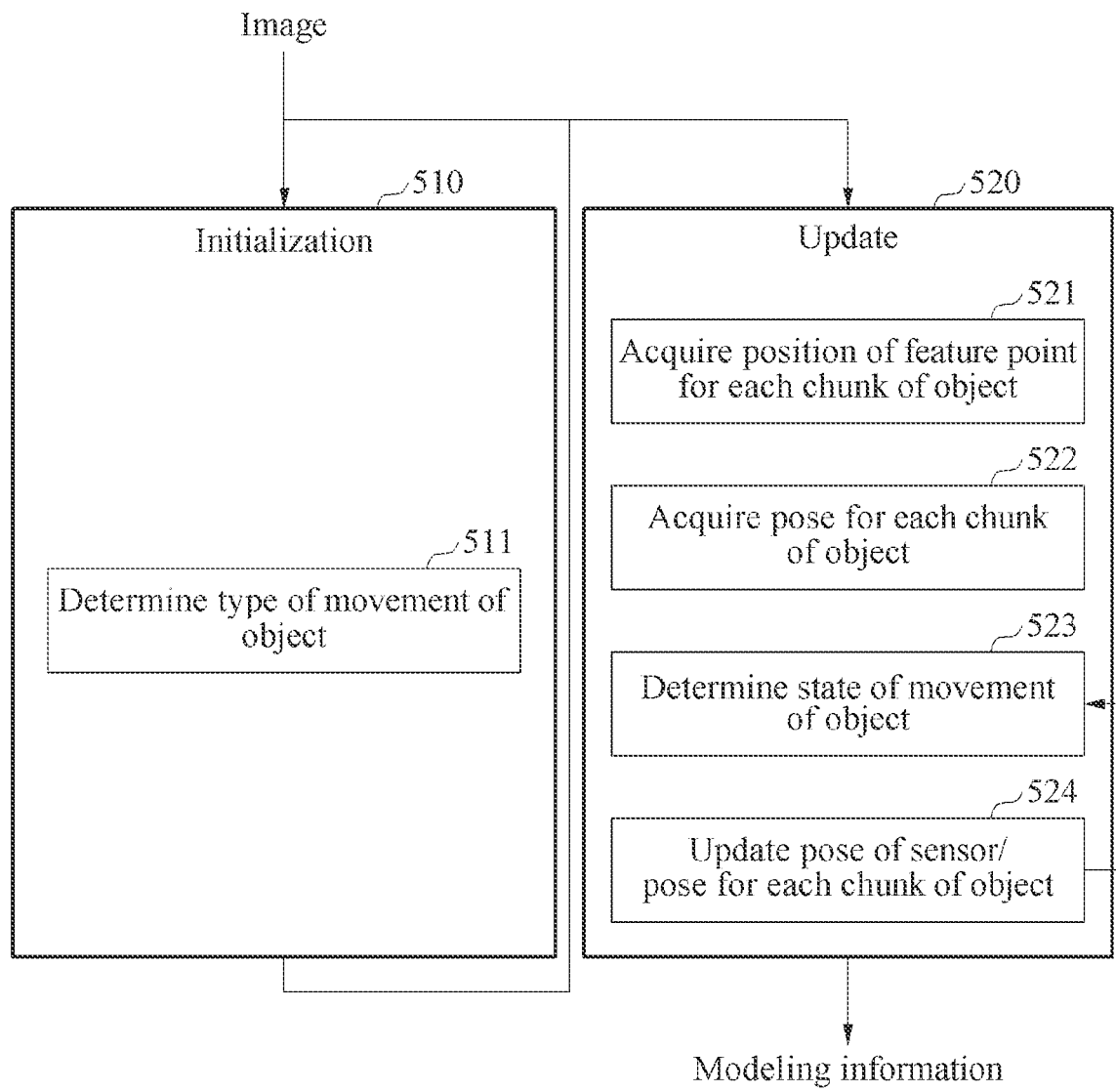
FIG. 5 illustrates an example of an operation of updating a model for 3D modeling.

FIG. 5 illustrates an example of an operation of updating a model for 3D modeling.

An initialization module 510 and an update module 520 of FIG. 5 may correspond to the initialization module 410 and the update module 420 of the model 400 of FIG. 4, respectively.

Referring to FIG. 5, the initialization module 510 of the model may perform operation 511 of determining a type of a movement of an object and the update module 520 may perform operation 521 of acquiring a position of a feature point for each chunk of the object, operation 522 of acquiring a pose for each chunk of the object, operation 523 of determining a state of the movement of the object, and operation 524 of updating a pose for each chunk of the object.

In an example, a preset number of frames of the image may be input to the initialization module 510 of the model. The initialization module 510 may perform operation 511 of determining the type of the movement of the object included in an input frame.

In an example, when the type of the movement of the object included in the image is determined by performing operation 511 for a portion of frames of the image through the initialization module 510, the frame of the image may be input to the update module 520. The frame input to the update module 520 may correspond to a subsequent frame according to temporal order of frame(s) input to the initialization module 510.

In an example, frames subsequent to the frame input to the initialization module 510 may be sequentially input to the update module 520. The update module 520 may perform operations 521 to 524 based on an input frame unit. For example, for each input frame, the update module 520 may perform operation 521 of acquiring a position of a feature point for each chunk of an object in a corresponding frame, operation 522 of acquiring a pose for each chunk of the object corresponding to the frame, operation 523 of determining a state of a movement of the object corresponding to the frame, and operation 524 of updating a pose of a sensor and a pose for each chunk of the object.

Operations 521 to 523 may correspond to operation 140 of FIG. 1.

For example, operation 521 may include an operation of acquiring the position of the feature point for each chunk of the object in the image from the input frame based on information about the object in the image of which the type of the movement is determined through operation 511 of the initialization module 510. For example, information about the object in the image may include identification information of the object recognized in the image. The identification information of the object may include identification information for each chunk included in the object. A position of a feature point for each chunk of the object corresponding to a corresponding frame may be acquired by a neural network that is trained to extract the feature point of the object based on identification information of the object included in the image. As another example, information about the object in the image may include tracking information for each chunk of the object based on previous frame(s) of the corresponding frame. The position of the feature point for each chunk of the object corresponding to the frame may be acquired based on tracking information for each chunk of the object.

Operation 522 may include an operation of acquiring the pose for each chunk of the object corresponding to the corresponding frame based on the position of the feature point for each chunk of the object. As described above, the pose of the chunk may include information about rotation and a position of the corresponding chunk that is acquired based on a position of a feature point included in the chunk.

Operation 523 may include an operation of determining the state of the movement of the object corresponding to the corresponding frame based on the type of the movement of the object and the pose for each chunk of the object. The state of the movement of the object may be determined based on a difference between a pose for each chunk of the object corresponding to a previous frame updated through operation 524 performed on the previous frame and a pose for each chunk of the object acquired through operation 522 performed on a current frame. As described above with reference to FIG. 1, an object of which a type of a movement corresponds to the first type may be determined to be in a static state at all times and an object of which a type of a movement corresponds to the second type may be determined in a static state when a pose of the chunk is not changed and may be determined to be in a moving state if the pose is changed. An object of which a type of a movement corresponds to the third type may be determined to be in a static state when a pose for each chunk is not changed and may be determined to be in a moving state when the pose is changed. The moving state may be classified into a rigid body motion state when changes in poses of the entire chunks included in the object correspond to the same aspect and may be classified into a deformation state when the changes in the poses of the chunks included in the object correspond to different aspects.

Operation 524 may correspond to operation 150 and operation 160 of FIG. 1. That is, operation 524 may include an operation of correcting the pose of the sensor based on a state of the object and an operation of updating the pose for each chunk of the object based on the state of the object and the corrected pose of the sensor. The updated pose for each chunk of the object may be used for operation 523 performed for a subsequent frame.

In an example, when it is determined that the image is to be initialized while the frame of the image is input to the update module 520 and an operation is being performed by the update module 510, that is, when it is determined that a process of determining again the type of the movement of the object included in the image through operation 511 of the initialization module 510 is to be performed, the frame of the image may be input again to the initialization module 510. A case in which it is determined that the initialization of the image is to be performed may include, for example, a case in which a new object of which a type of a movement is not determined is recognized in a frame input to the update module 520, a case in which a predetermined period is reached, or a case in which an operation of the update module 520 is performed on a preset number of frames. For example, when the new object of which the type of the movement is not determined is recognized in the corresponding frame while operation 521 is being performed on a specific frame, the corresponding frame and a portion of frames of the image received after the corresponding frame may be input to the initialization module 510 and operation 511 of determining the type of the movement of the object included in the image may be performed based on the corresponding frame and a portion of frames of the image received after the corresponding frame.

In an example, a 3D modeling method may include determining a type of a movement of an object included in an image based on a portion of frames of the image, in correspondence to each of frames of the image received after the portion of the frames, acquiring a position of a feature point for each chunk of the object in a corresponding frame based on information about the object of which the type is determined, acquiring a pose for each chunk of the object corresponding to the corresponding frame based on the position of the feature point for each chunk of the object, determining a state of the movement of the object corresponding to the corresponding frame based on the type of the movement of the object and the pose for each chunk of the object, correcting a pose of a sensor based on a state of the object, and updating the pose for each chunk of the object based on the state of the object and the corrected pose of the sensor.

In an example, an operation of acquiring the position of the feature point for each chunk of the object in the corresponding frame may include determining the type of the movement of the object included in the image based on the corresponding frame and the portion of the frames of the image received after the corresponding frame, in response to recognizing a new object of which the type is not determined in the corresponding frame.

Figure 6:
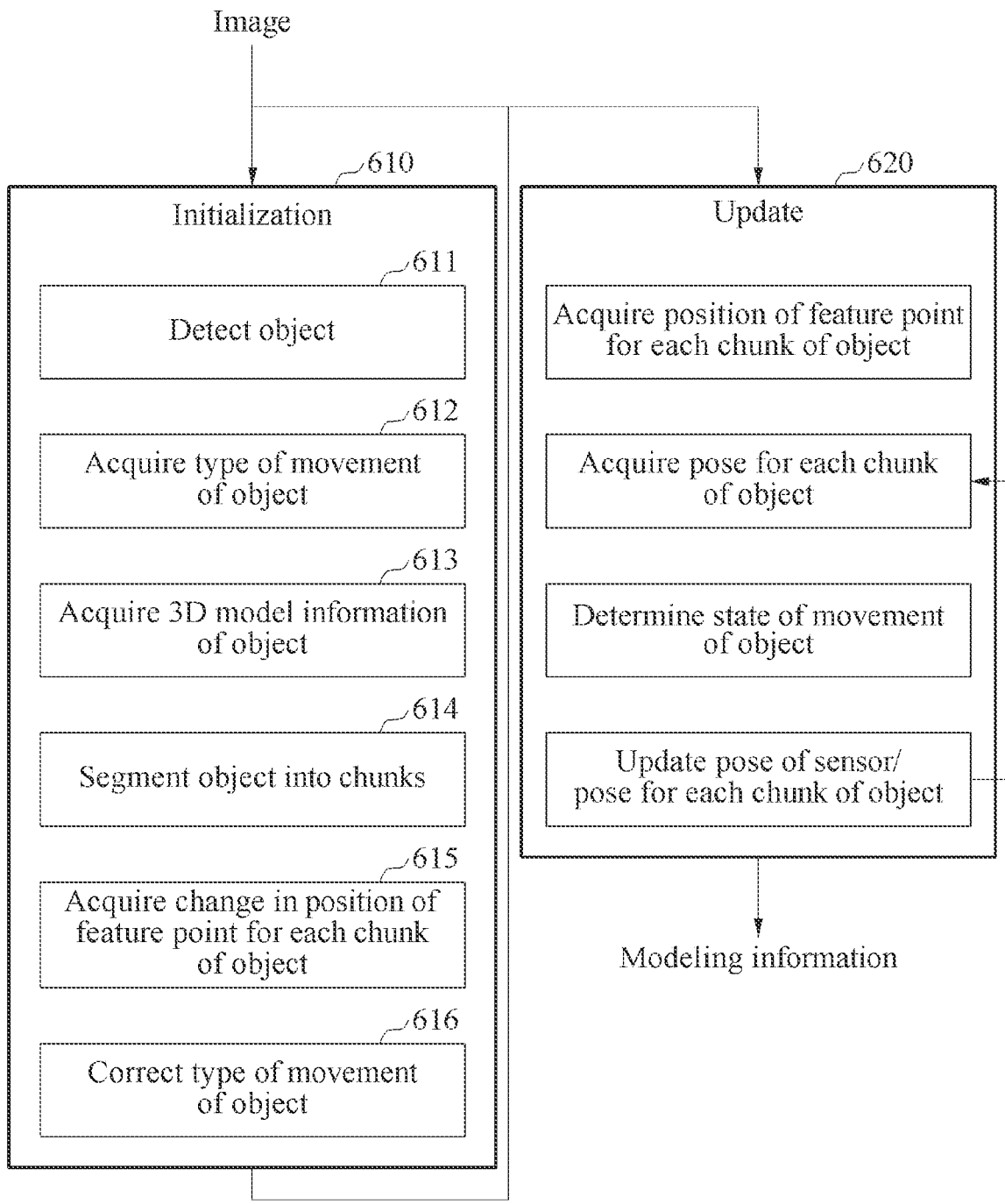
FIG. 6 illustrates an example of an operation of initializing a model for 3D modeling.

FIG. 6 illustrates an example of an operation of initializing a model for 3D modeling.

An initialization module 610 and an update module 620 of the model of FIG. 6 may correspond to the initialization module 410 and the update module 420 of the model 400 of FIG. 4, respectively. Also, the update module 620 of FIG. 6 may correspond to the update module 520 of the model of FIG. 5, and the initialization module 610 illustrates in detail operation 511 of the initialization module 510 of FIG. 5.

Referring to FIG. 6, to determine a type of a movement of an object, the initialization module 610 may perform operation 611 of detecting the object from an image input to the initialization module 610, operation 612 of acquiring the type of the movement of the object, operation 613 of acquiring 3D model information of the object, operation 614 of segmenting the object into chunks, operation 615 of acquiring a change in a position of a feature point for each chunk of the object, and operation 616 of correcting the type of the movement of the object.

Operations 611 and 612 may correspond to operation 110 of FIG. 1. For example, operation 611 may include an operation of detecting and recognizing an object included in a frame by performing segmentation and/or classification on the frame being input. Operation 612 may include an operation of acquiring the type of the movement that is matched to identification information of the object according to operation 611 based on a type determination rule related to a predetermined movement.

Operation 613 and 614 may correspond to operation 12 of FIG. 1. For example, operation 613 may include at least one of an operation of acquiring prestored 3D model information and an operation of acquiring 3D model information corresponding to the object by reconstructing an image of the object included in the image. Operation 614 may include an operation of segmenting the object into chunks corresponding to a unit of movement based on the type of the movement of the object and 3D model information corresponding to the object.

In an example, operations 615 and 616 may correspond to operation 130 of FIG. 1. For example, operation 615 may include an operation of acquiring the change in the position of the feature point for each chunk of the object based on a difference between positions of feature points for each chunk of the object acquired in correspondence to a plurality of frames input to the initialization module 610. Operation 616 may include an operation of determining the type of the movement to be corrected based on an aspect of changes in positions of feature points included in the object.

Figure 7:
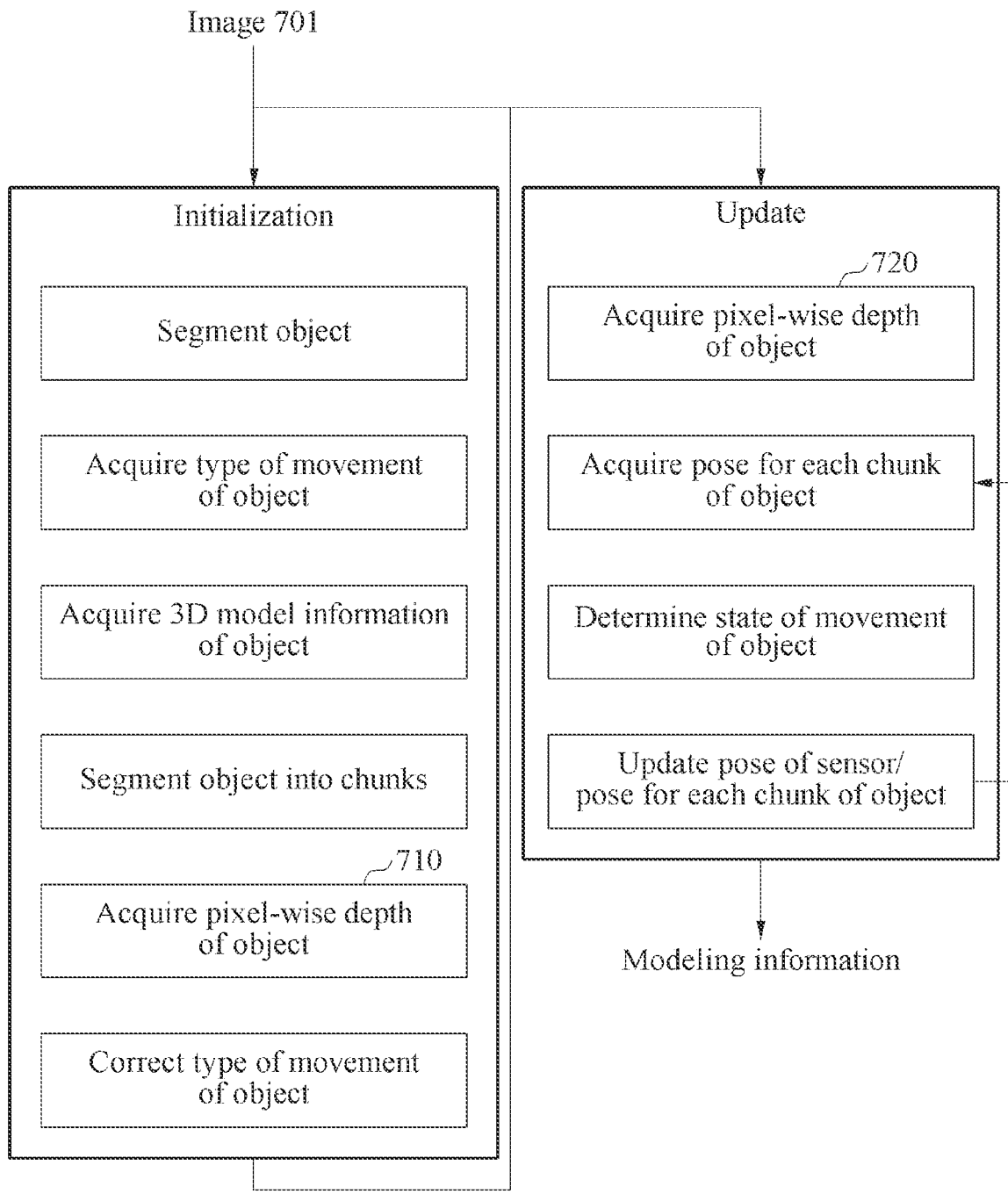
FIG. 7 illustrates an example of a 3D modeling method using depth information of an image.

FIG. 7 illustrates an example of a 3D modeling method using depth information of an image.

FIG. 7 illustrates an example of an operation of the initialization module 410 of FIG. 4 and an operation of the update module 420 of the model 400 of FIG. 4. Other operations excluding operation 710 of an initialization module of FIG. 7 and operation 720 of an update module may correspond to operations of the initialization module 610 and the update module 620 of FIG. 6 and operations of the update module 520 of FIG. 5.

Operation 710 may correspond to an operation of determining an aspect of a movement for each chunk of an object by acquiring a pixel-wise depth in a frame of an image 701 to correct a type of a movement of the object. Dissimilar to operation 615 of FIG. 6, operation 710 may correspond to an operation of acquiring an aspect of the movement for each chunk of the object based on a change in the pixel-wise depth instead of using a change in a position of a feature point for each chunk of the object. For example, a pixel-wise depth of a frame may be acquired by estimating normalized object coordinate space (NOCS) information about the input image 701. As another example, when the input image 701 is a depth image received from a depth sensor, a pixel-wise depth value may be acquired in a frame included in the depth image.

Operation 720 may correspond to an operation of acquiring a pixel-wise depth in correspondence to the frame of the image 701 input to the update module to acquire a pose for each chunk of the object. Also, dissimilar to operation 521 of FIG. 5, operation 720 may include an operation of determining a relative position relationship to acquire a pose of the object for each chunk of the object based on the pixel-wise depth instead of using the change in the position of the feature point for each chunk of the object.

FIG. 8 illustrates an example of a configuration of an apparatus.

Referring to FIG. 8, an apparatus 800 includes a processor 801 (e.g., one or more processors), a memory 803 (e.g., one or more memories), a communication module 805, and a sensor 807 (e.g., one or more sensors). The apparatus 800 may include an apparatus configured to perform the aforementioned 3D modeling method or an apparatus in which the aforementioned model for 3D modeling is implemented. For example, the apparatus 800 may include a user device, such as, for example, a smartphone, a personal computer, and a tablet PC, augmented reality (AR) glasses, a sensor, and a server.

In an example, the processor 801 may perform any one, any combination of any two or more of, or all operations described above with reference to FIGS. 1 to 7. For example, the processor 801 may perform at least one operation according to operations included in the 3D modeling method of FIG. 1. Also, for example, the processor 801 may perform at least one operation performed by the model described above with reference to FIGS. 4 to 7.

The memory 803 may be a volatile memory or a nonvolatile memory, and may store data related to the 3D modeling method described above with reference to FIGS. 1 to 7. For example, the memory 803 may store data generated during a process of performing the 3D modeling method or data required to perform the 3D modeling method. For example, the memory 803 refers to a memory accessible by the processor 801 and may store 3D model information corresponding to at least one object. The memory 803 may include, for example, a random-access memory (RAM), a dynamic RAM (DRAM), a static RAM (SRAM), and/or other types of nonvolatile memory that are known in the related technical field.

The apparatus 800 according to an aspect may connect to an external apparatus, for example, a personal computer or a network, through a communication module 805 and may exchange data. For example, the apparatus 800 may receive an image captured by the sensor 807 (or, as another non-limiting example, from an external sensor through the communication module 805) and may output modeling information corresponding to the input image as a 3D modeling result. The sensor 807 may refer to an image capturing sensor and may be or include, for example, a camera.

In an example, the memory 803 may store a program or instructions in which the 3D modeling method described above with reference to FIGS. 1 to 7 is implemented. The processor 801 may execute the program or instructions stored in the memory 803 and may control the server 800. A code of the program executed by the processor 801 may be stored in the memory 803. The memory 803 may store instructions that, when executed by the processor 801, configure the processor 801 to perform any one, any combination of any two or more of, or all operations described above with respect to FIGS. 1 to 7.

In an example, the server 800 may further include other components not illustrated herein. For example, the server 800 may further include an input/output (I/O) interface that includes an input device and an output device as a method for interfacing with the communication module 805. As another example, the server 800 may further include other components, such as a transceiver, a variety of sensors (e.g., the sensor 807), and a database.

The apparatuses, processors, memories, communication modules, sensors, apparatus 800, processor 801, memory 803, communication module 805, sensor 807, and other apparatuses, units, modules, devices, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD–Rs, CD+Rs, CD–RWs, CD+RWs, DVD-ROMs, DVD–Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with three-dimensional (3D) modeling, comprising:
   determining a type of a movement of an object detected in an image received from a sensor;
   segmenting the object into chunks corresponding to a unit of movement based on the type of the movement of the object and 3D model information corresponding to the object;
   correcting the type of the movement of the object based on a change in a position of a feature point for each chunk of the object in the image;
   determining a state of the movement of the object based on the corrected type of the movement of the object and a pose for each chunk of the object that is determined in correspondence to a frame of the image;
   correcting a pose of the sensor based on a state of the object; and
   updating the pose for each chunk of the object based on the state of the object and the corrected pose of the sensor.

2. The method of claim 1, wherein the correcting the type of the movement of the object comprises:
  determining the change in the position of the feature point for each chunk of the object based on previous frames of the frame in the image;
  determining whether a relative position between chunks included in the same object is changed based on the change in the position of the feature point for each chunk of the object; and
  correcting the type of the movement of the object based on a result of the determining of whether the relative position is changed.

3. The method of claim 1, wherein the determining the state of the movement of the object comprises:
  determining a pose of each chunk of the object corresponding to the frame based on a position of a feature point of each chunk of the object that is estimated in correspondence to the frame;
  determining transformation information of the pose for each chunk of the object based on a pose for each chunk of the object that is determined in correspondence to a previous frame of the frame and the pose for each chunk of the object that is determined in correspondence to the frame; and
  determining the state of the movement of the object based on the corrected type of the movement of the object and the transformation information of the pose for each chunk of the object.

4. The method of claim 3, wherein the determining the pose for each chunk of the object corresponding to the frame comprises estimating the feature point for each chunk of the object corresponding to the frame based on a neural network that is trained to extract the feature point for each chunk of the object.

5. The method of claim 3, wherein the determining the pose for each chunk of the object corresponding to the frame comprises estimating the feature point for each chunk of the object corresponding to the frame based on tracking of the feature point for each chunk of the object included in the image.

6. The method of claim 1, wherein the correcting the pose of the sensor comprises correcting the pose of the sensor based on a pose for each chunk of the object that is determined to be in a static state as a result of determining the state of the movement of the object.

7. The method of claim 1, wherein the updating the pose for each chunk of the object comprises updating the pose for each chunk of the object that is determined to be in a moving state as a result of determining the state of the movement of the object based on the corrected pose of the sensor.

8. The method of claim 1, wherein the type of the movement of the object comprises any one or any combination of any two or more of a first type in which a position and a shape of the object are invariable, a second type in which the position of the object is variable and the shape of the object is invariable, and a third type in which the position and the shape of the object are variable.

9. The method of claim 1, wherein the determining the type of the movement of the object comprises determining the type of the movement of the object that matches identification information of the object based on the identification information of the object that is detected through segmentation of the image.

10. The method of claim 1, wherein the segmenting the object into the chunks comprises either one or both of:
  determining 3D model information prestored in correspondence to the object; and
  determining 3D model information corresponding to the object by reconstructing an image of the object included in the image.

11. The method of claim 1, further comprising:
  outputting either one or both of the pose of the sensor and the pose for each chunk of the object.

12. The method of claim 1, wherein the 3D model information corresponding to the object comprises mesh information for representing a shape of the object and structural information of the object.

13. A non-transitory computer-readable storage medium storing instructions that, when executed by one or more processors, configure the one or more processors to perform the method of claim 1.

14. A processor-implemented method with three-dimensional (3D) modeling, comprising:
  determining a type of a movement of an object included in an image based on a portion of frames of the image received from a sensor; and
  for each of frames of the image received after the portion of the frames:
    determining a position of a feature point for each chunk of the object in a corresponding frame based on information about the object of which the type is determined;
    determining a pose for each chunk of the object corresponding to the corresponding frame based on the position of the feature point for each chunk of the object;
    determining a state of the movement of the object corresponding to the corresponding frame based on the type of the movement of the object and the pose for each chunk of the object;
    correcting a pose of the sensor based on a state of the object; and
    updating the pose for each chunk of the object based on the state of the object and the corrected pose of the sensor.

15. The method of claim 14, wherein the determining the position of the feature point for each chunk of the object in the corresponding frame comprises determining the type of the movement of the object included in the image based on the corresponding frame and the portion of the frames of the image received after the corresponding frame, in response to recognizing a new object of which the type is not determined in the corresponding frame.

16. An apparatus with three-dimensional (3D) modeling, comprising:
  one or more processors configured to:
    determine a type of a movement of an object detected in an image received from a sensor;
    segment the object into chunks corresponding to a unit of movement based on the type of the movement of the object and 3D model information corresponding to the object;
    correct the type of the movement of the object based on a change in a position of a feature point for each chunk of the object in the image;
    determine a state of the movement of the object based on the corrected type of the movement of the object and a pose for each chunk of the object that is determined in correspondence to a frame of the image;
    correct a pose of the sensor based on a state of the object; and
    update the pose for each chunk of the object based on the state of the object and the corrected pose of the sensor.

17. The apparatus of claim 16, wherein, for the correcting the type of the movement of the object, the one or more processors are configured to:
  determine the change in the position of the feature point for each chunk of the object based on previous frames of the frame in the image;
  determine whether a relative position between chunks included in the same object is changed based on the change in the position of the feature point for each chunk of the object; and
  correct the type of the movement of the object based on a result of the determining of whether the relative position is changed.

18. The apparatus of claim 16, wherein, for the determining the state of the movement of the object, the one or more processors are configured to:
  determine a pose for each chunk of the object corresponding to the frame based on a position of a feature point of each chunk of the object that is estimated in correspondence to the frame;
  determine transformation information of the pose for each chunk of the object based on a pose for each chunk of the object that is determined in correspondence to a previous frame of the frame and the pose for each chunk of the object that is determined in correspondence to the frame; and
  determine the state of the movement of the object based on the corrected type of the movement of the object and the transformation information of the pose for each chunk of the object.

19. An apparatus with three-dimensional (3D) modeling, comprising:
  one or more processors configured to:
  determine a type of a movement of an object included in an image based on a portion of frames of the image received from a sensor; and
  for each of frames of the image received after the portion of the frames:
    determine a position of a feature point for each chunk of the object in a corresponding frame based on information about the object of which the type is determined;
    determine a pose for each chunk of the object corresponding to the corresponding frame based on the position of the feature point for each chunk of the object;
    determine a state of the movement of the object corresponding to the corresponding frame based on the type of the movement of the object and the pose for each chunk of the object;
    correct a pose of the sensor based on a state of the object; and
    update the pose for each chunk of the object based on the state of the object and the corrected pose of the sensor.

20. The 3D modeling apparatus of claim 19, wherein, for the determining the position of the feature point for each chunk of the object in the corresponding frame, the one or more processors are configured to determine the type of the movement of the object included in the image based on the corresponding frame and the portion of the frames of the image received after the corresponding frame in response to recognizing a new object of which the type is not determined in the corresponding frame.

21. A processor-implemented method with three-dimensional (3D) modeling, comprising:
  determining a type of movement of an object detected in an image received from a sensor, based on a variability of a position of the object and a variability of a shape of the object;
  segmenting the object into one or more chunks each corresponding to a unit of movement, based on the determined type of movement;
  correcting the determined type of movement based on a change in position of one or more feature points of the one or more chunks of the object in the image;
  determining a state of the movement of the object based on the corrected type of the movement of the object;
  correcting a pose of the sensor based on a state of the object; and
  updating a pose for each of the one or more chunks of the object based on the determined state of the object and the corrected pose of the sensor.

22. The method of claim 21, wherein the correcting of the determined type of movement comprises correcting the determined type of movement in response to the change in position not corresponding to the determined type of movement.

23. The method of claim 22, wherein
  the determined type of movement indicates an invariability of the position of the object, and
  the correcting of the determined type of movement comprises correcting the determined type of movement in response to the change in position not corresponding to the invariability.

24. The method of claim 22, wherein
  the change in position comprises a change in position between feature points of a same chunk of the one or more segmented chunks,
  the determined type of movement indicates an invariability of the shape of the object, and
  the correcting of the determined type of movement comprises correcting the determined type of movement in response to the change in position between the feature points of the same chunk not corresponding to the invariability.

25. The method of claim 21, wherein each of the one or more segmented chunks indicates the unit of motion such that a distance between feature points of the chunk is maintained in response to a movement of the object.

* * * * *